United States Patent [19]

Hutchines et al.

[11] 4,047,091

[45] Sept. 6, 1977

[54] CAPACITIVE VOLTAGE MULTIPLIER

[75] Inventors: Jimmy L. Hutchines, San Jose; John E. Meyer, Saratoga, both of Calif.

[73] Assignee: National Semiconductor Corporation, Santa Clara, Calif.

[21] Appl. No.: 707,395

[22] Filed: July 21, 1976

[51] Int. Cl.$^2$ .................................... H02M 7/00
[52] U.S. Cl. .................................... 363/59; 357/51
[58] Field of Search ................ 321/15; 357/41, 51

[56] References Cited

U.S. PATENT DOCUMENTS

| | | | |
|---|---|---|---|
| 3,824,447 | 7/1974 | Kuwabara | 321/15 |
| 3,942,047 | 3/1976 | Buchanan | 321/15 X |
| 3,955,353 | 5/1976 | Astle | 321/15 X |
| 3,975,671 | 8/1976 | Stoll | 321/15 |

OTHER PUBLICATIONS

"Electronics," Capacitors Add Up in Voltage Multiplier, H. R. Mallory, Mar. 2, 1970, p. 104.
"Scientific & Technical Aerospace Report," NASA, Issue No. 9, p. 1430, N65-18948, p. 8.

*Primary Examiner*—William M. Shoop

*Attorney, Agent, or Firm*—Gail W. Woodward; Willis E. Higgins

[57] ABSTRACT

A voltage multiplier in which an n-phase circuit charges n-1 capacitors during the separate phases, then during the last or nth phase the capacitors are put in series to create n times the input voltage. MOS transistor devices are used to act as switches to charge a number of series connected capacitors. During a first phase of operation, the first in the series of capacitors is charged to a specific voltage to be multiplied by closing the MOS switches to place the voltage across the capacitor. During a next phase of operation, the first capacitor is disconnected by the switches and the next capacitor in series is charged to the input voltage. During successive phases of operation, successive capacitors are similarly charged. During the last phase of operation, the capacitors are connected in series with the voltage to be multiplied and are connected to an output capacitor. This places a total charge on the output capacitor which is equal to the sum of all the charges on the respective series connected capacitors plus the voltage to be multiplied. This results in an n+1 voltage multiplication wherein n is the number of series connected capacitors.

3 Claims, 1 Drawing Figure

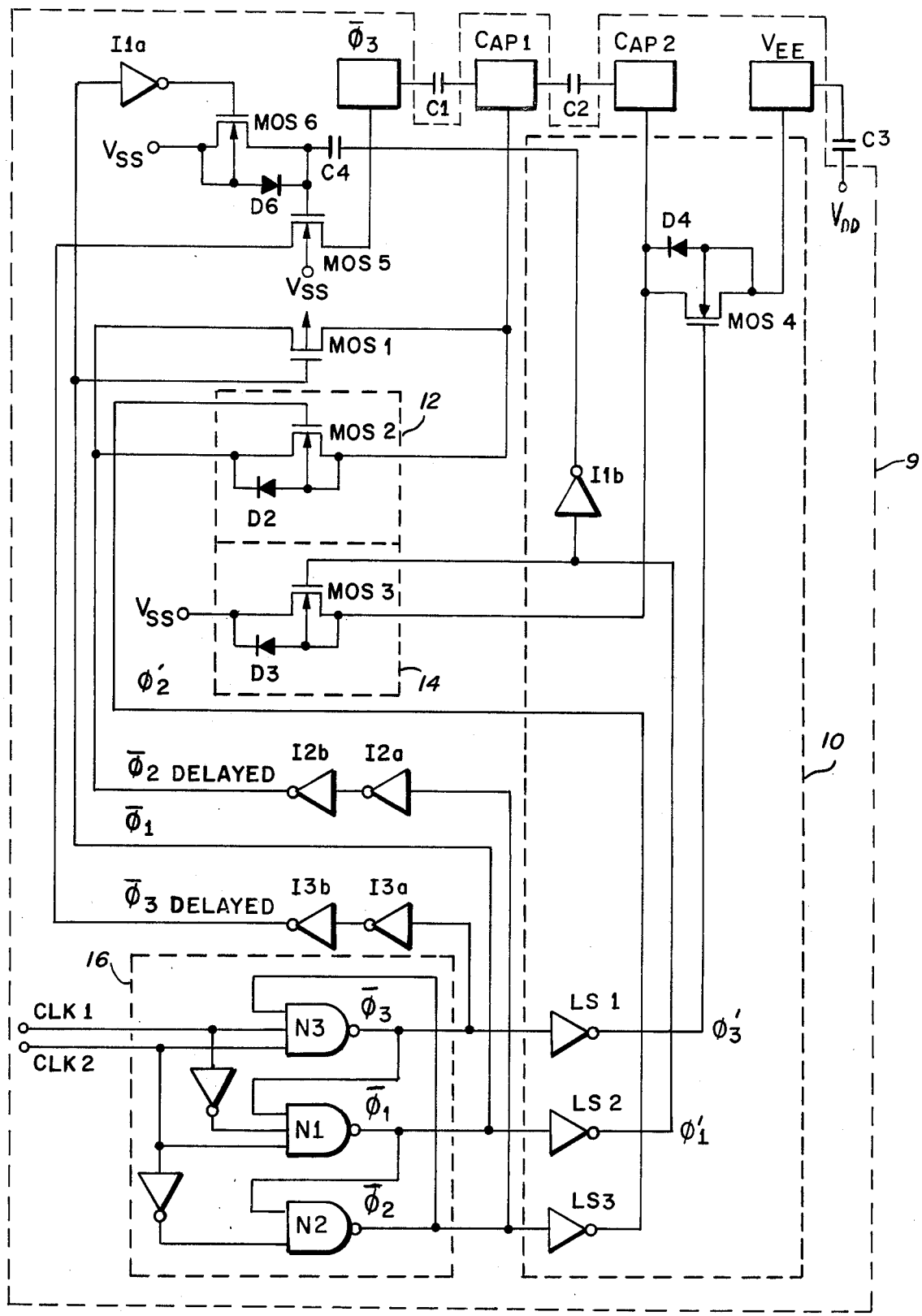

{"# CAPACITIVE VOLTAGE MULTIPLIER

BACKGROUND OF THE INVENTION

The present invention relates in general to voltage multiplier circuits and, more particularly, to an MOS voltage multiplier circuit.

DESCRIPTION OF THE PRIOR ART

Integrated circuit technology is utilized in low voltage applications where space is at a premium, such as in digital watches using low power batteries. In such an application, a higher voltage than that supplied by the battery is necessary to drive the time indicating display. Thus, a voltage multiplier circuit is necessary using a minimum number of components external to the integrated circuit, a minimum number of external connecting pins, and a minimum amount of interconnection circuitry within the integrated circuit.

In the past, an n-time-voltage multiplier required $2n$ pin connections.

Furthermore, in prior voltage multipliers the output voltage is a multiple of the input voltage minus the voltage drop across the transistor or diode circuits utilized. This voltage drop cannot be tolerated in a low voltage system, and since MOS transistor switches can have enough gain to minimize such voltage drops, they are particularly suitable in a voltage multiplier.

SUMMARY OF THE PRESENT INVENTION

It is a primary object of the present invention to provide an MOS voltage multiplier.

It is also an object of the invention to provide a voltage multiplier which simplifies the interconnecting circuitry and reduces the number of components which are external to the integrated circuit chip.

Briefly, the above objects are accomplished in accordance with the invention by providing a circuit made up of external capacitors connected in series across the pins of an integrated circuit chip. The pins of the chip are connected internally to MOS transistor switches which are operated by a clocking circuit to provide for a multiphase circuit operation.

During successive phases of operation, MOS switches are closed in such a manner that the series connected capacitors are charged successively during each phase to the input voltage. During the final phase of operation, the last capacitor charged is connected to the input voltage and the first capacitor charged is connected to an output capacitor, such that the voltage developed across the output capacitor is the sum of all the voltages across the series connected capacitors plus the input voltage.

The circuit has the advantage that it results in output pin efficiency. In the past, an $n$-times voltage multiplier needed $2n$ pin connections. With the present invention, only $n+1$ connections are required for the $n-1$ capacitors across which charges are developed.

The invention has the further advantage that since it uses MOS transistors, the multiplied voltage will not be degraded by diode drops generally caused when transistor circuits are used.

DESCRIPTION OF THE DRAWINGS

The foregoing and other objects, features and advantages of the invention will be apparent from the following detailed description of a preferred embodiment of the invention, as illustrated in the accompanying drawings wherein the single FIGURE is a schematic diagram of a voltage multiplier incorporating features of the present invention.

DESCRIPTION OF THE PREFERRED EMBODIMENT

Referring now to the drawing, an MOS voltage multiplier circuit is shown wherein the output voltage across the capacitor $C_3$ is a multiple of the input voltage $V_{SS}$. The integrated circuit chip itself is designated by dashed line 9. Capacitors C1, C2, and C3 are off-chip devices connected by conventional pads indicated by the rectangular elements labeled $\overline{3}$, CAP1, CAP2, and $V_{EE}$.

The dotted lines 10 indicate a p-channel tub which is common to the most negative supply voltage ($V_{EE}$) that is created. Devices $I_{1B}$, $L_{S1}$, $L_{S2}$ and $L_{S3}$ contain $n$-channel devices connected such that their sources and substrates are the $V_{EE}$ supply. All other n-channel devices, not within dotted lines, have their substrates connected to the $V_{SS}$ supply.

MOS 2 and MOS 3 are each in their own individual tubs as indicated by dotted lines 12 and 14. The substrate connections through diodes $D_2$ and $D_3$, respectively, prevent the substrate diodes of MOS 2 and MOS 3 from clamping the generated voltages at CAP 1 and CAP 2 back to $V_{SS}$. With the substrate connections as shown, the back gate bias effect (body effect) on MOS 2 and MOS 3 is minimal.

A three phase circuit is shown within dotted lines 16. Clock lines CLK 1 nd CLK 2 from an external source are combined in NAND circuits $N_1$, $N_2$ and $N_3$ to produce signals $\overline{\Phi 1}$, $\overline{\Phi 2}$, and $\overline{\Phi 3}$. These signals are powered by level shifters $L_{S1}$, $S_{S2}$ and $L_{S3}$ to produce the basic timing signals for the circuity $\Phi_1'$, $\Phi_2'$ and $\Phi_3'$, respectively. Only one of these outputs is energized at a time, and $\Phi_2'$ may be longer than $\Phi_2'$ or $\Phi_3'$, for reasons set forth below.

The voltage across capacitor $C_3$ is multiplied by successively charging capacitors $C_1$ and $C_2$ to the voltage $V_{DD}$ minus $V_{SS}$. During phase two and phase three, the gate of MOS 1 is held at $V_{DD}$ level by NAND gate $N_1$ thus turning MOS 1 off.

MOS 2 is an $n$-channel device with its substrate connected to CAP1 to reverse bias diode $D_2$ allowing CAP1 to become more negative than $V_{SS}$. The substrate of MOS 2 is not connected to $V_{EE}$ as this would increase the body effect (M factor), thus requiring a larger device to transfer the same amount of charge.

During phase 1, the gate of MOS 2 is held at $V_{EE}$ by level shifter LS3 thereby turning MOS 2 off.

During phase 2, MOS transfers the voltage $V_{SS}$ provided by inverter I2b to the CAP1 pad. This causes the capacitor $C_1$ to be charged to the voltage $V_{DD}$ by the action MOS 5.

Since the gate of MOS 3 is held at $V_{EE}$ level by the level shifter LS2, MOS 3 is held off during phase 2 and phase 3. With MOS 3 off, shifting CAP1 from the $V_{DD}$ level to the $V_{SS}$ level will cause CAP2 to be shifted from the $V_{SS}$ level to the $V_{DD}$ minus $V_{SS}$ level below $V_{SS}$.

During phase 3, the gate of MOS 2 is held at $V_{EE}$ level by level shifter LS3 thereby turning MOS 2 off.

MOS 3 is an $n$-channel device with its substrate connected to CAP2 to reverse bias diode $D_3$ which allows CAP2 to be more negative than CAP1. The substrate is not connected to $V_{EE}$ as this would increase the body effect (M factor) thereby requiring a larger device to transfer the same amount of charge."}

During phase 1 of the operation, MOS 3 transfers the $V_{SS}$ voltage level to CAP2 which, since CAP1 is held at $V_{DD}$ by the operation of MOS 1, charges capacitor $C_2$ to the voltage $V_{DD}$ minus $V_{SS}$. During phase 2 and phase 3, the gate of MOS 3 is held at the $V_{EE}$ voltage level by level shifter LS2, thus turning MOS 3 off.

MOS 4 is an n-channel device with its substrate connected to $V_{EE}$ which reverse biases diode $D_4$, thus allowing $V_{EE}$ to become more negative than CAP2.

During both phases 1 and 2, the gate of MOS 4 is held at the $V_{EE}$ voltage level by level shifter LS1, therefore turning MOS 4 off.

During phase 3, MOS 4 turns on, closing a path between CAP 2 and $V_{EE}$ to thereby transfer charge from capacitors $C_1$ and $C_2$ in series to capacitor $C_3$.

MOS 5 is an n-channel device with its substrate connected to $V_{SS}$.

During phase 1, the gate of MOS 5 is held at the $V_{SS}$ voltage level through MOS 6, which allows the not phase 3 pad to float. Since MOS 5 is an n-channel device, phase 3 can be driven more positive than $V_{DD}$. This allows the charge stored on capacitor $C_1$ to be maintained during phase 1 when CAP1 is driven to the voltage $V_{DD}$ by inverter I2b through MOS 1 as explained above.

During phae 2, MOS 5 transfers the $V_{DD}$ voltage level provided by inverter I3b to the not phase 3 pad. Since CAP1 is held at the $V_{SS}$ level by MOS 2 during phase 2, capacitor $C_1$ will charge to the voltage $V_{DD}$ minus $V_{SS}$.

During phase 3, MOS 5 transfers the $V_{SS}$ level provided by inverter I3b to the not phase 3 pad. Since during phase 3 devices MOS 1, MOS 2 and MOS 3 are all turned off, the CAP1 pad shifts to the $V_{DD}$ minus $V_{SS}$ level below $V_{SS}$, i.e. ($2V_{SS}$-$V_{DD}$. This shift from the $V_{SS}$ level of phase 2 to the $V_{SS}$ minus $V_{DD}$ level of phase 3 on the CAP1 pad will shift the $V_{SS}$ minus $V_{DD}$ level of CAP2 pad of phase 2 to the $3V_{SS}$ minus $V_{DD}$ level during phase 3. As described above, MOS 4 transfers the charge from capacitors $C_1$ and $C_2$ in series to capacitor $C_3$ during phase 3. The charges on $C_1$ and $C_2$ in series will balance with the charge on $C_3$ until the $V_{EE}$ level and the CAP2 level are equal.

MOS 6 is an n-channel device with its substrate connected to $V_{SS}$.

During phase 2 MOS 6 transfers the $V_{SS}$ voltage level to the gate of MOS 5, which turns MOS 5 off. During phase 1, the output of inverter I1b is at the $V_{EE}$ level and capacitor $C_4$ is charged to the voltage $V_{SS}$ minus $V_{EE}$.

During phase 2 and phase 3, the output of inverter I1a applies the voltage $V_{SS}$ to the gate of MOS 6 turning it off. This allows the gate of MOS 5 to float. During phase 2, the output of inverter I1b swings from the voltage $V_{EE}$ to $V_{DD}$ forcing the gate of MOS 6 to the voltage $V_{SS}$ plus $V_{DD}$ minus $V_{EE}$. This allows MOS 5 to pull the not phase 3 pad to the voltage level $V_{DD}$ which is provided by inverter I3B. Level shifter LS1 provides a delay which insures that the inverter I1a will turn MOS 6 off before the inverter I1b will begin to swing positive. MOS 1 and MOS 6 have their gates driven from the voltage $V_{SS}$ to insure correct power of operation regardless of the initial conditions of the output not phase 3, CAP1, CAP2 or $V_{EE}$. MOS 2, MOS 3 and MOS 4 have their gates driven from the voltage $V_{EE}$ in order to provide gate drive negative enough to completely turn the transistors off at the appropriate time. It should be understood that it may be desirable to make phase 2 longer than phase 1 or phase 3 to thereby give MOS 5 more time to refresh the charge on capacitor $C_1$ during the phase 2 operation described above.

It should further be understood that the source and drain of MOS 5 may be shorted together connecting the output of I3b directly to the not phase 3 pad. Thus, with capacitor $C_2$ eliminated and with capacitor $C_1$ connected between the not phase 3 pad and the CAP 2 pad, the circuit will perform as a voltage doubler capable of forcing $V_{EE}$ to the voltage $V_{DD}$ minus $V_{SS}$ below $V_{SS}$ ($2V_{SS}$-$V_{DD}$).

While the invention has been particularly shown and described with reference to a preferred embodiment thereof, it will be understood by those skilled in the art that various changes is form and detail which may be made therein without departing from the spirit and scope of the invention.

What is claimed is:

1. A voltage multiplier comprising:
   a plurality of capacitors connected in series across the output pads of an integrated circuit chip;
   a clock circuit providing multiphase voltage output;
   means connecting the pads of said chip to MOS transistor switches;
   means interconnecting said MOS switches to said clocking circuit such that during successive phases of operation said switches are closed in such a manner that the series connected capacitors are separately charged to the input voltage successively during each phase of said clock circuit; and
   means operable during the final phase of operation of said clock for connecting an output capacitor to said input voltage and said series connected capacitors such that the voltage developed across the output capacitors is the sum of all the voltages across the series connected capacitors plus the input voltage.

2. A voltage multiplier comprising:
   an integrated circuit chip having a first pad, a second pad, a third pad, and a fourth pad;
   a clock circuit providing three outputs, a first phase, a second phase, and a third phase, wherein during each phase the respective output rises from a first voltage level to a second voltage level;
   a first capacitor connected across said first and second pads;
   a second capacitor connected across said second pad and said third pad;
   a first and second MOS transistor connected source to drain between said second pad and said second phase output including means for energizing said first transistor during said first phase and said second transistor during said second phase whereby said first voltage level is applied to said second pad during said first phase and said second voltage level is applied to said second pad during said second phase;
   a third MOS transistor connected between said third pad and said second voltage level including means for energizing said third transistor during said first phase for transferring said second voltage level to said third pad;
   a fourth MOS transistor connected between said third and fourth pad operable during said third phase for connecting said third and fourth pads together;
   a fifth MOS transistor connected between said first pad and said third phase output energizable during said second phase for transferring said first voltage level to said first pad;

whereby during said first phase of operation said second capacitor is charged to a voltage which is the difference between said first and second voltages applied to said second and third pads, respectively, through said first and third MOS transistors and whereby during said second phase said first capacitor is charged to a voltage which is the difference between said second and first voltges supplied by said second and fifth transistors, respectively, and whereby during said third phase of operation said third and fourth pads are connected together through said fourth MOS transistor to thereby apply the voltage on said capacitors to said fourth pad.

3. The combination according to claim 2 further comprising an output capacitor connected to said fourth pad and returned to said first voltage level to thereby provide for the transfer of the charge across said first and second capacitors to said output capacitor.

* * * * *